United States Patent
Dvir et al.

(10) Patent No.: US 9,118,982 B2
(45) Date of Patent: Aug. 25, 2015

(54) OPTICAL LINE TERMINAL (OLT) OPTICAL MODULE ADAPTED TO PERFORM OPTICAL UNIT NETWORK (ONU) FUNCTIONALITY

(75) Inventors: Amiad Dvir, Nes Ziona (IL); Eliezer Weitz, Holon (IL)

(73) Assignee: Broadcom Corporation, Irvine, CA (US)

( * ) Notice: Subject to any disclaimer, the term of this patent is extended or adjusted under 35 U.S.C. 154(b) by 30 days.

(21) Appl. No.: 13/368,887

(22) Filed: Feb. 8, 2012

(65) Prior Publication Data

US 2013/0202300 A1 Aug. 8, 2013

(51) Int. Cl.
H04B 10/40 (2013.01)
H04B 10/077 (2013.01)
H04J 14/02 (2006.01)
H04Q 11/00 (2006.01)

(52) U.S. Cl.
CPC ....... *H04Q 11/0066* (2013.01); *H04B 10/0771* (2013.01); *H04B 10/0775* (2013.01); *H04B 10/40* (2013.01); *H04J 14/02* (2013.01); *H04Q 11/0067* (2013.01); *H04Q 11/0071* (2013.01)

(58) Field of Classification Search
None
See application file for complete search history.

(56) References Cited

U.S. PATENT DOCUMENTS

| 6,980,287 | B2 | 12/2005 | Renard et al. |
| 7,167,237 | B2 | 1/2007 | Shimizu et al. |
| 7,428,382 | B2 | 9/2008 | Soto et al. |
| 7,573,897 | B2 * | 8/2009 | Elmoalem et al. ............ 370/458 |
| 7,643,753 | B2 * | 1/2010 | Weitz et al. ..................... 398/67 |
| 7,715,718 | B2 | 5/2010 | Smith et al. |
| 8,682,163 | B2 | 3/2014 | Yang |
| 2004/0196664 | A1 | 10/2004 | Renard et al. |
| 2005/0019036 | A1 * | 1/2005 | Soto et al. ....................... 398/135 |
| 2007/0116465 | A1 * | 5/2007 | Bieker ............................. 398/70 |
| 2007/0122157 | A1 * | 5/2007 | Vandewege et al. .......... 398/141 |

(Continued)

FOREIGN PATENT DOCUMENTS

| CN | 101790111 A | 7/2010 |
| EP | 2 383 908 A1 | 11/2011 |

(Continued)

OTHER PUBLICATIONS

European Search Report for EP Patent Application No. EP13000379.1, European Patent Office, Munich, Germany, mailed on Jun. 13, 2013.

(Continued)

*Primary Examiner* — David Payne
*Assistant Examiner* — Casey Kretzer
(74) *Attorney, Agent, or Firm* — Sterne, Kessler, Goldstein & Fox P.L.L.C.

(57) ABSTRACT

An optical line terminal (OLT) is operable in a passive optical network (PON). The OLT comprises a plurality of optical network units (ONUs), an electrical module for generating continuous downstream signal and processing received upstream burst signals according to a communication protocol of the PON and an optical module for transmitting continuous optical signals over a first wavelength and receiving burst optical signals over a second wavelength. The optical module further includes an ONU traffic processing module is electrically coupled to the optical module and the electrical module. The ONU traffic processing module is configured to emulate one of the ONUs of the PON. An interface is used for interfacing between the electrical module and the optical module.

22 Claims, 7 Drawing Sheets

(56) References Cited

U.S. PATENT DOCUMENTS

| | | |
|---|---|---|
| 2007/0153823 A1 | 7/2007 | Wojtowicz |
| 2008/0008212 A1* | 1/2008 | Wang et al. ............ 370/503 |
| 2008/0031624 A1* | 2/2008 | Smith et al. ............ 398/71 |
| 2009/0060496 A1 | 3/2009 | Liu et al. |
| 2009/0060507 A1* | 3/2009 | Effenberger et al. ......... 398/60 |
| 2009/0115999 A1 | 5/2009 | Watte et al. |
| 2009/0268197 A1 | 10/2009 | Perron et al. |
| 2010/0098413 A1 | 4/2010 | Li et al. |
| 2010/0166419 A1 | 7/2010 | Elmoalem et al. |
| 2010/0278533 A1* | 11/2010 | Julien et al. ............ 398/58 |
| 2011/0013904 A1 | 1/2011 | Khermosh et al. |
| 2011/0102776 A1 | 5/2011 | Hasegawa et al. |
| 2011/0116799 A1 | 5/2011 | Effenberger |
| 2011/0150475 A1 | 6/2011 | Soto et al. |
| 2011/0170858 A1* | 7/2011 | Aguren ............ 398/22 |
| 2011/0182588 A1 | 7/2011 | Wojtowicz |
| 2011/0211827 A1* | 9/2011 | Soto et al. ............ 398/25 |
| 2011/0274426 A1* | 11/2011 | Yang ............ 398/16 |
| 2011/0280568 A1 | 11/2011 | Dvir et al. |
| 2011/0318002 A1 | 12/2011 | Sitton et al. |
| 2012/0020672 A1* | 1/2012 | Aguren ............ 398/139 |
| 2012/0045205 A1 | 2/2012 | Perron |
| 2012/0051701 A1 | 3/2012 | Sicari et al. |
| 2012/0183289 A1* | 7/2012 | Lou et al. ............ 398/9 |
| 2013/0202290 A1 | 8/2013 | Dvir |

FOREIGN PATENT DOCUMENTS

| | | |
|---|---|---|
| WO | WO 2004/079404 A3 | 9/2004 |
| WO | WO 2011/007298 A1 | 1/2011 |

OTHER PUBLICATIONS

Communication from the Examining Division of the European Patent Office directed to related European Patent Application No. 13 000 379, Munich, Germany, mailed Jun. 26, 2013; 8 pages.

Non-Final Office Action for U.S. Appl. No. 13/478,970, mailed Dec. 11, 2013; 23 pages.

Notice of Allowance for U.S. Appl. No. 13/478,970, mailed Apr. 9, 2014; 8 pages.

Notice of Allowance for U.S. Appl. No. 13/478,970, mailed Jun. 26, 2014; 6 pages.

First Office Action directed to related Chinese Patent Application No. 201310049492.9, mailed Feb. 9, 2015; 9 pages.

* cited by examiner

Conventional Art

OPTICAL LINE TERMINAL (OLT) OPTICAL MODULE ADAPTED TO PERFORM OPTICAL UNIT NETWORK (ONU) FUNCTIONALITY

TECHNICAL FIELD

The present invention relates generally to passive optical networks (PONs), and more particularly to an architecture of an optical network unit (ONU) integrated in an optical module of an optical line terminal (OLT).

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include a Broadband PON (BPON), an Ethernet PON (EPON), ten Gigabit-Ethernet PON (10G-EPON) a Gigabit PON (GPON), ten-Gigabit PON (XG-PON), and others.

Figure 1:
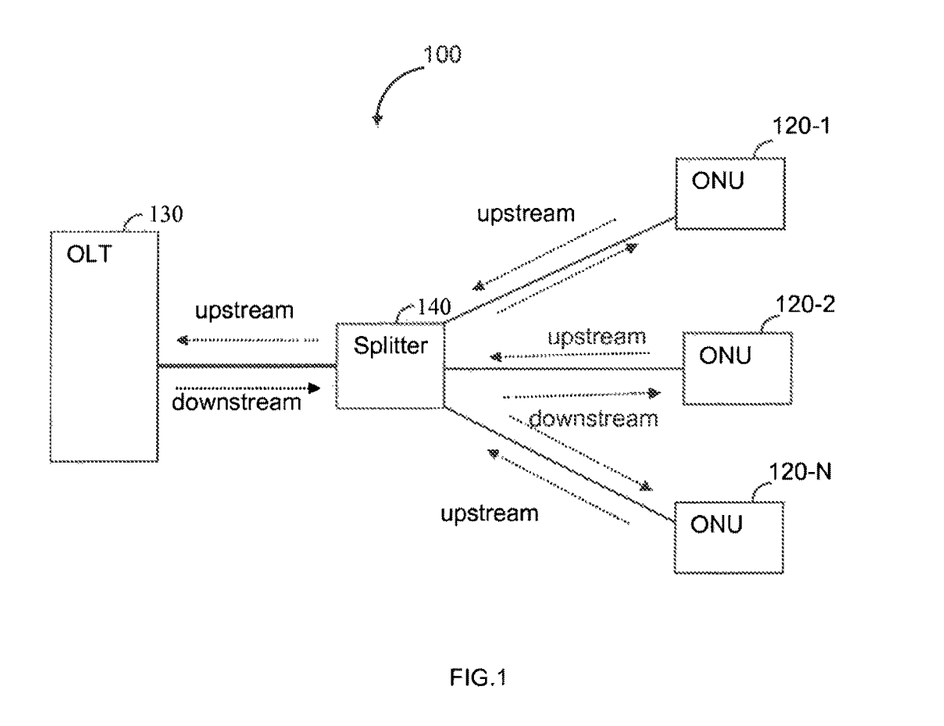
FIG. 1 is a schematic diagram of a PON.

An exemplary diagram of a typical PON 100 is schematically shown in FIG. 1. The PON 100 includes N ONUs 120-1 through 120-N (collectively referred to as ONUs 120) connected to an OLT 130 via a passive optical splitter 140 and the optical fiber. In a GPON, for example, traffic data transmission is achieved using GPON encapsulation method (GEM) over two optical wavelengths, one for the downstream direction and another for the upstream direction. Thus, downstream transmission from the OLT 130 is broadcast to all the ONUs 120. Each ONU 120 filters its respective data according to pre-assigned labels (e.g., GEM port-IDs in a GPON). The splitter 140 is 1 to N splitter, i.e., capable of distributing traffic between a single OLT 130 and N ONUs 120.

In most PON architectures, the upstream transmission is shared between the ONUs 120 in a TDMA based access, controlled by the OLT 130. TDMA requires that the OLT 130 first discovers the ONUs and measures their round-trip-time (RTT), before enabling coordinated access to the upstream link. With this aim, the OLT 130, during a ranging state, tries to determine the range between the terminal units (i.e., ONUs 120) to find out at least the RTT between OLT 130 and each of the ONUs 120. The RTT of each ONU 120 is necessary in order to coordinate a TDMA based access of all ONUs 120 to the shared upstream link. During a normal operation mode, the range between the OLT 130 to the ONUs 120 may change over time due to temperature changes on the fiber links (which results with varying signal propagation time on the fiber). Thus, the OLT 130 continuously measures the RTT and adjusts the TDMA scheme for each ONU accordingly.

Figure 2:
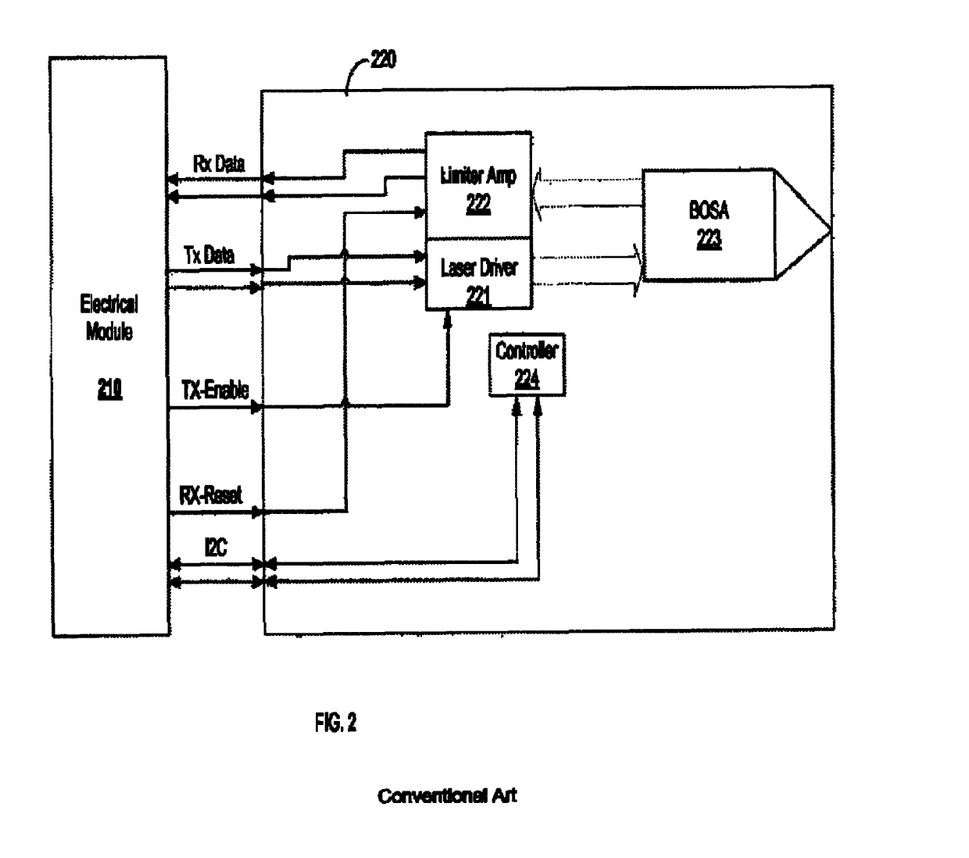
FIG. 2 is a block diagram of a conventional OLT.

As schematically shown in FIG. 2, an OLT 200 operable, for example, in a GPON or XG-PON includes an electrical module 210 and an optical module 220. The electrical module 210 is responsible for the processing of received upstream burst signals and generating of downstream signals. The electrical module 210 typically includes a network processor and a media access control (MAC) adapter designed to process and handle upstream and downstream signals according to a respective PON standard.

The optical module 220 in most cases is implemented as a small form-factor pluggable (SFP) transceiver that receives optical burst signals sent from ONUs and transmits continuous optical signals to ONUs. The reception and transmission of signals is over two different wave lengths. For example, in a GPON, in the downstream direction, the optical module 220 generates an optical signal of 1480 nm to 1500 nm (as referred to as 15XY) and in the upstream direction receives optical signals between 1260 nm and 1360 nm (also referred to as 13XY in GPON).

The optical module 220 includes a laser driver diode 221 coupled to a transmit photodiode that produces optical signals based on the electrical signals provided by a laser diode driver 221. The module 220 also includes a limiter amplifier 222 coupled to a receive photodiode that produces current in proportion to the amount of light of the optical input burst signal. The limiter amplifier 222 generates two current levels indicating if a received burst signal is '1' or '0' logic value.

The receiver and transmit photodiodes are realized as a bidirectional optical sub-assembly (BoSa) module 223 that can transmit and receive high rate optical signals. The optical module 220 also includes a controller 224 that communicates with the electrical module 210 through the I2C interface and performs tasks related to calibration and monitoring of the transceiver.

Vendors of the OLTs typically develop and fabricate the electrical module 210 of the OLT, where the optical module 220 is often an off-the-shelf transceiver, such as SFP, XFP and the like. Thus, the interface between the electrical module 210 and the optical module 220 is a standard interface being compatible with any type of SFP transceiver. As illustrated in FIG. 2, the interface includes wires for receive (RX) data, transmit (TX) data, TX-enabled signal, RX-Reset signal, and I2C for interfacing between the electrical module 210 and the controller 224. The I2C interface is a relatively slow serial interface with a data rate of up to 4 Mb/sec. In contrast, the RX data and TX data interfaces are high speed interfaces where the data rate of signals over these interfaces is as the data rate of the PON (e.g., 1 Gb/sec in a GPON).

In certain PON configurations, a dedicated ONU is connected to the PON to perform maintenance and service availability applications. For example, a dedicated ONU can be utilized as part of a protection mechanism. As other examples, a dedicated ONU can be utilized to perform optical time-domain reflectometer (OTDR) analysis in the PON, measured RTT values, detect optical faults, and so on. Examples for utilization of dedicated ONUs in the PON can be found in co-pending U.S. patent application Ser. Nos. 12/648,885 and 13/189,935 assigned to common assignee and are hereby incorporated by reference for the useful understanding of the background of the invention.

However, in conventional solutions, a dedicated ONU is connected through an optical fiber (which may be a dedicated fiber, the PON's fiber, or combination thereof) to the OLT. As a result, any applications or services that utilize the dedicated ONU should take into account the delay induced by the optical fiber connecting the OLT to the ONU. In addition, the dedicated ONU should be a small optical distance from the OLT. By way of example, the protection system discussed in the Ser. No. 12/648,885 application, an OLT is connected to a dedicated ONU (i.e., collocated ONU) through a splitter and a dedicated optical fiber to form an optical link utilized for continuous calculation of the differential distance.

It would be therefore advantageous to provide a solution for enabling zero optical distance connectivity between such a dedicated ONU and an OLT. It would be further advantageous to eliminate any optical connectivity between the dedicated ONU and the OLT.

SUMMARY OF THE INVENTION

Certain embodiments disclosed herein include an optical line terminal (OLT) includes an optical line terminal (OLT) operable in a passive optical network (PON) including a plurality of optical network units (ONUs). The OLT comprises an electrical module for generating continuous downstream signal and processing received upstream burst signals according to a communication protocol of the PON; an optical module for transmitting continuous optical signals over a first wavelength and receiving burst optical signals over a second wavelength, wherein the optical module further includes an optical network unit (ONU) traffic processing module being electrically coupled to the optical module and the electrical module, wherein the ONU traffic processing module is configured to emulate one of the ONUs of the PON; and an interface for interfacing between the electrical module and the optical module.

Certain embodiments disclosed herein also include an optical line terminal (OLT) includes an optical module apparatus in an optical line terminal (OLT) operable in a passive optical network (PON) including a plurality of optical network units (ONUs). The optical module apparatus comprises: an optical sub assembly module that comprises a first photodiode operable at a first wavelength for transmitting continuous optical signals over a first wavelength and a second photodiode operable at a second wavelength for receiving burst optical signals over a second wavelength, wherein the optical module further includes an optical network unit (ONU); and an optical network unit (ONU) traffic processing module being configured to emulate one of the ONUs of the PON.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
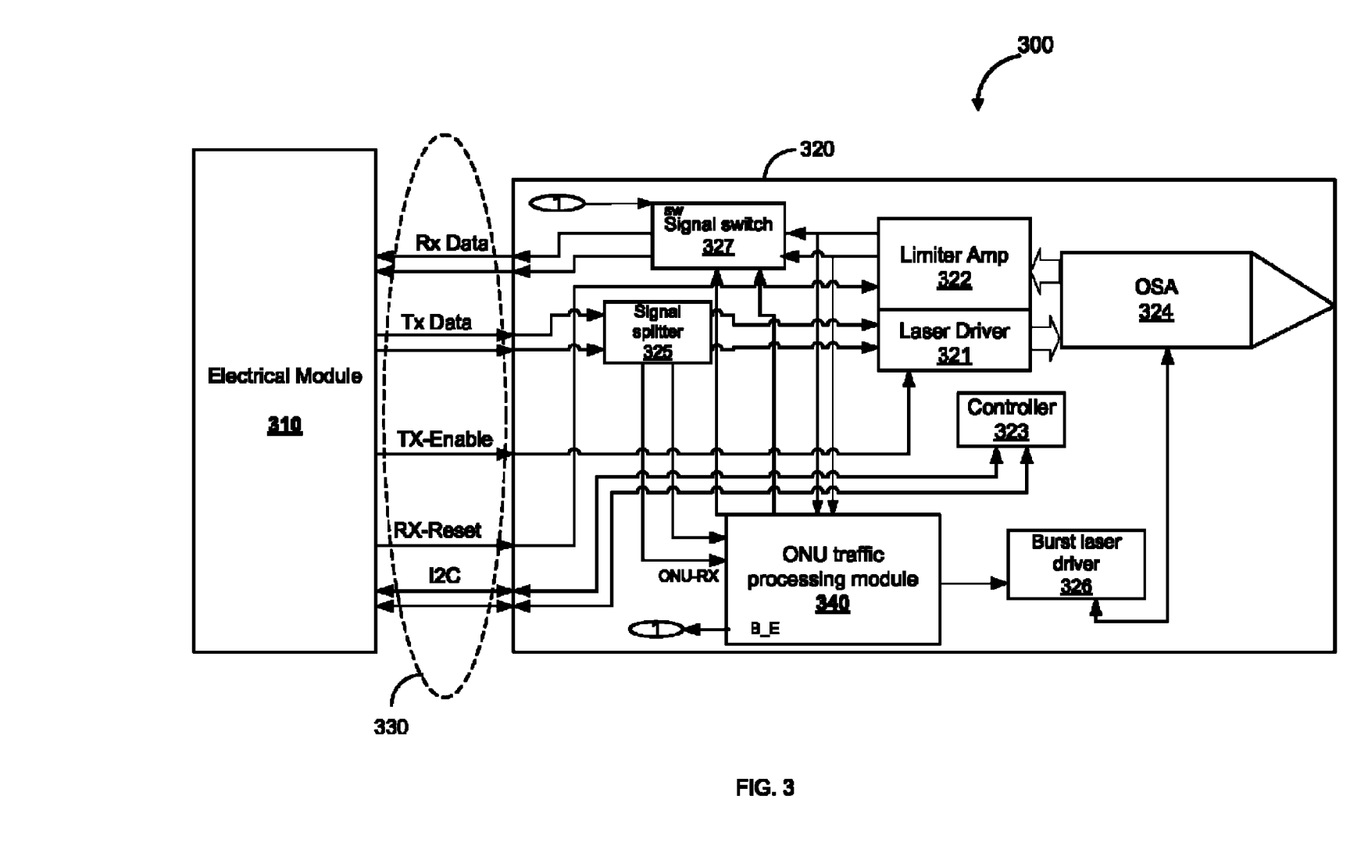
FIG. 3 is a block diagram of an OLT designed to perform ONU functionality according to one embodiment.

FIG. 3 shows an exemplary and non-limiting diagram of an optical line terminal (OLT) 300 constructed according to one embodiment. The OLT 300 includes an electrical module 310 and an optical module 320 connected to each other through a standard interface 330.

The interface 330 provides connectivity for transmitted (TX) signals, received (RX) signals, a TX-Enabled signal for enabling transmission to the ONUs, a RX-reset signal for resetting a reception of a current burst signal, and control (I2C) signals. As noted above, the interface 330 provides a standard connectivity compatible with different types SFP or other standard transceivers operable in an OLT.

The electrical module 310 processes the received upstream signals and generates downstream signals. The electrical module 310 typically includes a network processor and PON MAC adapter designed to process and handle upstream and downstream signals according to a respective PON standard. In an embodiment, the electrical module 310 handles PON upstream and downstream traffic compliant with at least any of the EPON, 10G-EPON, GPON, and XG-PON. In a downstream direction, a continuous signal is sent, for example, in a form of GEM frames in a GPON or XGEM frames in XG-PON, to all ONUs connected to the PON. Each ONU filters its respective data according to pre-assigned labels (e.g., GEM port-IDs in a GPON). The electrical module 310 allocates for each ONU a time slot in which the ONU can send data to the OLT. The reception of data, in the upstream direction, is of burst signals sent from the ONUs.

The optical module 320 receives upstream optical burst signals sent from ONUs and transmits a downstream continuous optical signal to ONUs. The reception and transmission of these downstream/upstream signals is over two different wave lengths. For example, in a GPON, in the downstream direction, the optical module 320 generates an optical signal of a 15XY wavelength and in the upstream direction receives optical signals of a 13XY wavelength.

The optical module 320 includes a laser driver diode 321 and a limiter amplifier (Amp) driver 322 respectively coupled to a transmit laser diode and a receive photodiode. The functionality of the laser driver 321 and amplifier 322 are described above. The controller 323 communicates with the electrical module 310 through the I2C interface and performs tasks related to calibration and monitoring of the transceiver.

According to an embodiment, the transmit and receive optical elements coupled to the laser driver diode 321 and limiter amplifier 322 are part of an optical sub-assembly (OSA) module 324. In one embodiment, the OSA module 324 is a triplexer.

Figure 5:
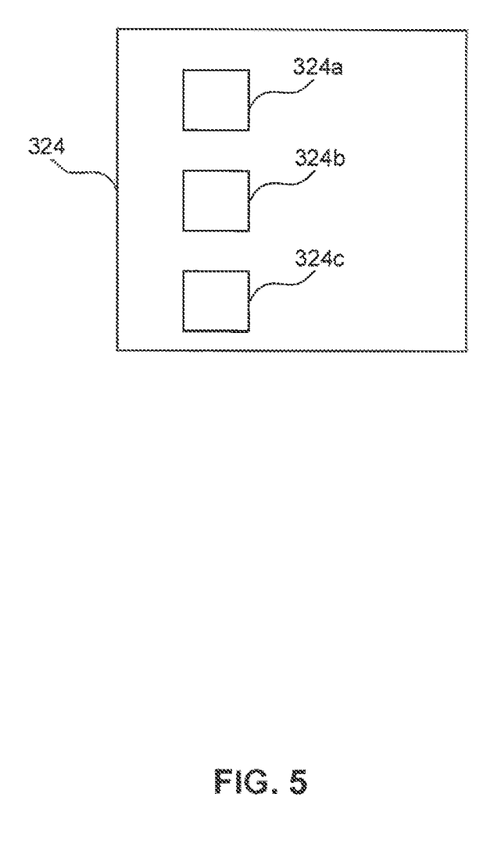
FIG. 5 is a block diagram of an illustrative optical sub-assembly according to one embodiment.

According to this embodiment, the OSA module 324 includes, in addition to a pair of transmit/receive photodiodes, a transmit photodiode, hereinafter the "ONU-TX-photo-diode" utilized for transmitting burst optical signals at a wavelength utilized by the ONUs in the PON downstream. As a non-limiting example shown in FIG. 5, the OSA module 324 includes a transmit photodiode 324*a* transmitting signals at a wavelength of 15XY, a receive photodiode 324*b* for receiving option signals at a wavelength of 13XY, and the ONU-TX-photodiode 324*c* for transmitting signals at a wavelength of 13XY. The ONU-TX-photodiode is driven by a burst laser driver 326 shown in FIG. 3. The burst laser driver 326 of FIG. 3 produces two current signals: bias and modulation. The bias current determines the optical power of '0' level and the modulation current determines the optical power of '1' level of a burst signal generated the ONU traffic processing module 340.

Figure 6:
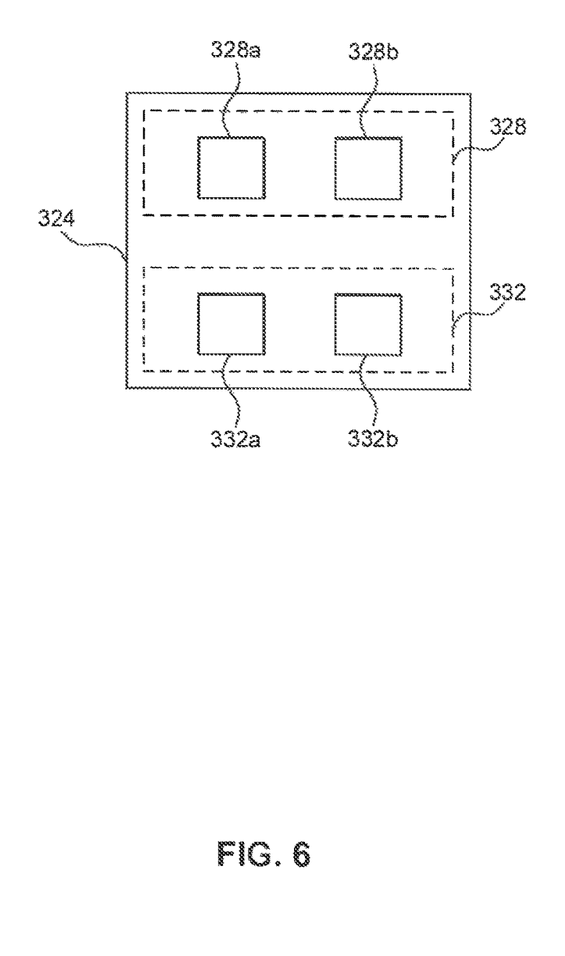
FIG. 6 is a block diagram of an alternate optical sub-assembly according to one embodiment.

According to another embodiment shown in FIG. 6, the OSA module 324 is quad-plexer that includes four optical elements, two laser diodes 328*a*, 332*a* and two photodiodes 328*b*, 332*b*. A first pair of transmit/receive optical elements 328 that operate at a wavelength of the OLT (an example provided above) and a second pair of transmit/receive optical elements 332 is utilized to transmit/receive signals by the ONU traffic processing module 340. The wavelengths of the second pair of transmit/receive photodiodes may be as defined for ONUs in the PON or a dedicated wavelength not defined by the respective PON communication standard. A pair transmit/receive optical element includes a laser diode and a photodiode.

According to various embodiments disclosed herein, integrated in the optical module 320 of the OLT 300 is the ONU traffic processing module 340, coupled to a signal splitter 335 for receiving signals to be transmitted to the PON. The ONU traffic processing module 340 is further connected to an output of the limiter amplifier 322 to provide duplicated samples of the received burst signals to the module 340. In an embodiment, the module 340 may be also connected to a signal switching unit 327 to transmit burst signals directly to the OLT electric module 310 and through the PON. The selection of the RX data for the electric module 310 is from the PON or the module 340 is based on a burst-enabled signal asserted by the ONU traffic processing module 340.

The ONU traffic processing module 340 is configured as any other ONU in the PON. That is, the ONU traffic processing module 340 is assigned with a unique ONU-ID to which the downstream traffic can be directed. Furthermore, the OLT's 300, by means of the electric module 310, can allocate a time slot to the ONU traffic processing module 340 for transmission of upstream data.

The ONU traffic processing module 340 is electrically connected to the OLT 300. Thus, data transmitted by the OLT 300 is not received at the module 340 through the optical fiber of the PON, but rather through the signal splitter 325. Thus, the optical distance between the ONU traffic processing module 340 and the OLT 300 is effectively zero, as such a distance is determined by the electrical path between the modules 310 and 340.

Figure 7:
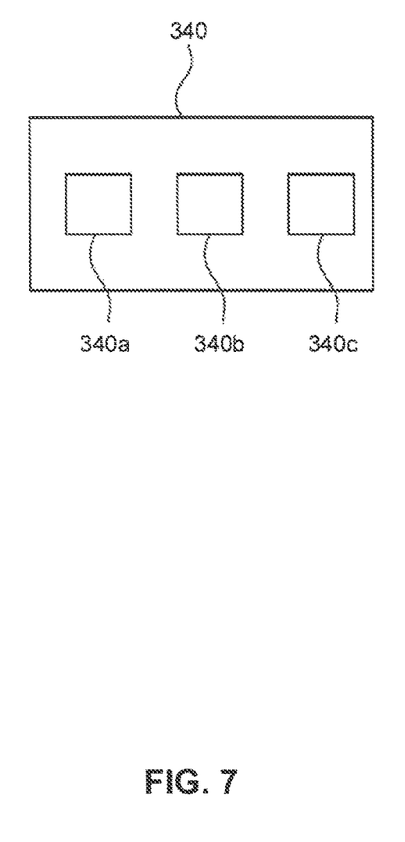
FIG. 7 is a block diagram of a an illustrative ONU traffic processing module according to one embodiment.

The ONU traffic processing module 340 includes a packet processor 340*a*, a PON MAC adapter 1401), and a network processor 340*c*, as shown in FIG. 7. The packet processor 340*a* typically performs PON processing tasks, such as filtering, forwarding-and-learning, flow classification, packets classification, queuing and shaping of packets, reassembling of packets, and so on.

As the module 340 is not connected to a subscriber device, the packet processor 340*a* processes only a downstream flow, i.e., data sent from an OLT. In an embodiment, the network processor 340*c* of the module 340 is configured to generate a set of predefined data patterns that can be sent to the PON through the OSA module 324, and eventually may be received by the OLT 300. Such generated and transmitted data patterns are utilized for various maintenance and service availability applications, including, but not limited to, PON protection, detection of optical failures, RTT measurements, and so on. In other embodiments, the module 340 can be configured to respond with data packet to a communication from the OLT.

The PON MAC 340*b* adapter included in the ONU traffic processing module 340 processes downstream traffic flows in accordance with the type of PON network. In an embodiment, the PON MAC adapter 340*b* of the module 340 processes GPON or XG-PON traffic. In this configuration, the PON MAC adapter 340*b* supports a plurality of traffic containers (T-CONTs). A T-CONT is a virtual upstream channel to which bandwidth is granted by the OLT's electrical module 310. A single T-CONT can be allocated for an ONU, a class of service (CoS), or a logical ONU. The PON MAC adapter 340*b* maintains T-CONT queues as the number of T-CONTs and cyclically requests for packets in order to fill a specific T-CONT queue.

The ONU traffic processing module 340 included in the optical module 320 serves as a dedicated ONU. However, in contrast to conventional solutions, the optical ONU traffic processing module 340 is electrically connected to the OLT 300 and not through an optical fiber. Thus, there is no need to use optical flitters and establish dedicated optical links, thus the modified OLT 300, simplifies the topology of the PON when such a dedicated ONU is required. The modified OLT 300 further simplifies the processing of various maintenance and service availability applications that can be performed using the dedicated ONU, i.e., ONU traffic processing module 340.

The ONU traffic processing module 340 can be implemented as an integrated circuit (IC), application-specific integrated circuit (ASIC), or a field-programmable gate array (FPGA) integrated in the optical module 320. In an exemplary embodiment, the ONU traffic processing module 340 can be realized as the enhanced PON processor described in U.S. Pat. No. 7,643,753 or as the PON processor with a programmable data path described in a co-pending U.S. patent application Ser. No. 12/821,931, both are assigned in common to the same assignee as the present application, and are hereby incorporated for all that they contain. According to an exemplary embodiment, the microprocessor and/or the network processor can be adapted to perform the maintenance and service availability applications when a dedicated ONU is utilized.

It should be noted that the integration of the ONU traffic processing module 340 in the OLT optical module 320 provides a standardized fast communication channel to the optical module 320, without changing the standard interface 330. This communication channel is realized by sending downstream data to the module 340 and receiving responses generated by the module 340 through the PON or through the signal switching unit 327. The communication channel complies with the PON communication standard. As mentioned above, on this communication channel, signals utilized in the processes related to testing the performance of the PON and the OLT, detection of optical failure, RTT measurements, and the like can be transported. Again, all such processes and their signals are transmitted by using the standard communication protocol of the PON.

Figure 4:
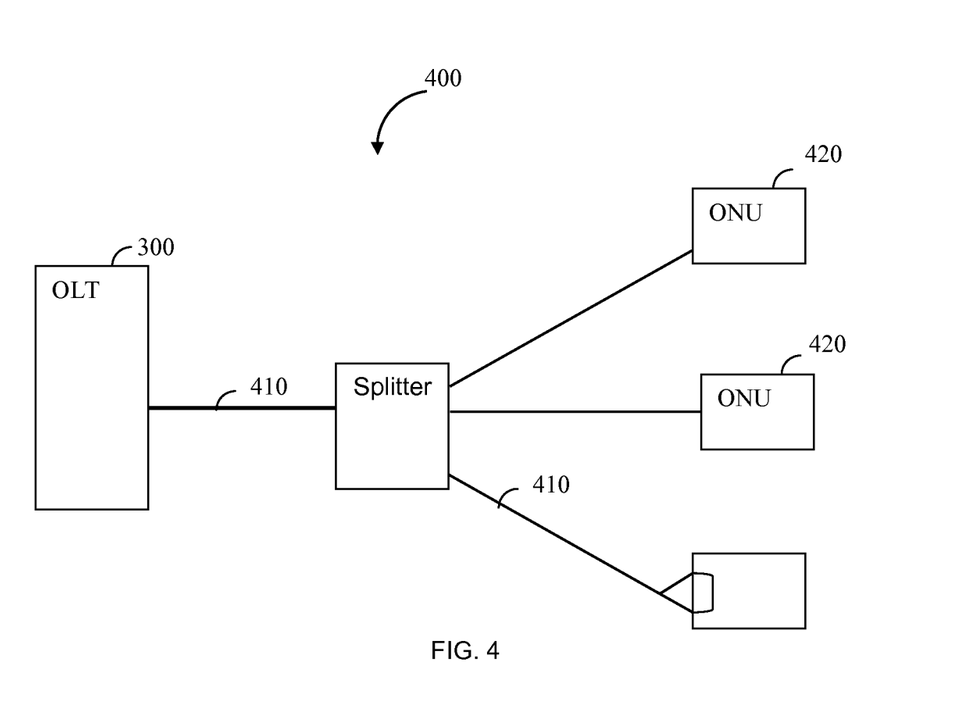
FIG. 4 is a schematic diagram of a PON utilized to describe a technique for measuring RTT using the disclosed OLT according to one embodiment of the invention.

As one example, described herein with reference to FIG. 4, the modified OLT 300 can be utilized to measure the RTT from the OLT 300 to ONU 420 across an optical fiber 410 of a PON 400. The RTT is necessary in order to coordinate a TDMA based access of all ONUs 420 to the shared upstream link. An updated RTT is also required for protection purposes, for example, when switching to a backup OLT.

Using conventional solution, the RTT is measured through a ranging process initiated by the OLT. The ranging process is a time-consuming task that results with a long service interruption time, as the PON remains idle for the duration that the ranging process takes place.

According to this embodiment, the RTT can be accurately measured in the OLT 300 by means of the ONU traffic processing module 340. With this aim, the OLT electrical module 310 allocates a time slot for transmission data by the ONU traffic processing module 340, which transmits an upstream signal through the OSA module 324 to the fiber 410. The upstream signal is looped back at the end of the fiber 410 to the OLT 300 and received by the receive photodiode in the OSA module 324. The received upstream signal at the output of the limiter amplifier 322 is also input to the ONU traffic processing module 340. Then, the RTT is measured as half of the time elapsed from when the upstream signal sent by the ONU traffic processing module 340 until received at the module 340. It should be noted that the RTT is exactly half the time it takes for an upstream signal to travel from and back to the OLT 300, as the optical distance between the OLT optical module 320 and the ONU traffic processing module 340 is zero.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An optical line terminal (OLT) comprises:
    an electrical module configured to generate continuous downstream signals and to process received upstream burst signals according to a communication protocol of a passive optical network (PON);
    an optical module configured to transmit continuous optical signals over a first wavelength and to receive upstream optical burst signals over a second wavelength,
    wherein the optical module comprises:
        an optical network unit (ONU) traffic processing module configured to:
            perform as an ONU of the PON,
            transmit the upstream electrical signals to the electrical module,
            test performance of the OLT,
            test performance of the PON,
            detect optical failures in the PON, or
            measure a round trip time (RTT) of the PON; and
        a signal splitter configured to split the downstream electrical signals into first downstream electrical signals and second downstream electrical signals, the first downstream electrical signals being provided to the ONU traffic processing module; and
    an interface between the electrical module and the optical module.
2. The OLT of claim 1, wherein the electrical module is further configured to assign the ONU traffic processing module with an ONU identification utilized to filter information sent in the first downstream electrical signals.
3. The OLT of claim 1, wherein the electrical module is further configured to allocate upstream time slots for transmission of the upstream electrical signals by the ONU traffic processing module.
4. The OLT of claim 1, wherein the ONU traffic processing module is further configured to generate an upstream test signal including a test pattern,
    wherein the optical module further comprises an optical sub assembly module that comprises a first laser diode operable at the first wavelength and a first photodiode operable at the second wavelength, the optical sub-assembly being configured to transmit the upstream test signal to the PON network, to receive a response from the upstream test signal from the PON, and to provide the response to the ONU traffic processing module, and
    wherein the ONU traffic processing module is further configured to process the response.
5. The OLT of claim 1, wherein the ONU traffic processing module includes at least a network processor, a microprocessor, and a medium access control adapter.
6. The OLT of claim 1, wherein the ONU traffic processing module provides a communication channel between the optical module and the electrical module that is compliant with the communication protocol.
7. The OLT of claim 6, wherein the interface is a small form-factor pluggable (SFP) interface.
8. The OLT of claim 7, wherein the PON is one of: an Ethernet PON (EPON), a ten Gigabit-Ethernet PON (10G-EPON), a Gigabit PON (GPON), and a ten Gigabit PON (XG-PON).
9. An optical line terminal (OLT), comprising:
    an electrical module configured to generate downstream electrical signals and to process upstream electrical signals according to a communication protocol of a passive optical network (PON); and
    an optical module configured to transmit downstream optical signals over a first wavelength and to receive upstream optical signals over a second wavelength,
    wherein the optical module comprises:
        an optical network unit (ONU) traffic processing module configured to perform as an ONU of the PON and to transmit the upstream electrical signals to the electrical module,
        an optical sub assembly module that comprises a first laser diode operable at the first wavelength and a first photodiode operable at the second wavelength;
        a laser driver coupled to the first laser diode;
        a limiter amplifier coupled to the first photodiode;
        a controller coupled to an interface between the electrical module and the optical module; and
        a signal splitter, coupled to the interface, configured to split the downstream electrical signals into first downstream electrical signals for the ONU traffic processing module and second downstream electrical signals for the laser driver.
10. The OLT of claim 9, wherein the ONU traffic processing module is coupled to an output of the limiter amplifier and further configured to receive the upstream electrical signals.
11. The OLT of claim 9, wherein the optical sub assembly module further comprises:
    a second laser diode operable at the second wavelength.
12. The OLT of claim 11, wherein the second wavelength is a wavelength utilized by at least one of a plurality of ONUs of the PON for upstream communication.
13. The OLT of claim 9, wherein the optical sub assembly module further comprises:

a second laser diode configured to transmit the downstream optical signals based on analysis signals generated by the ONU traffic processing module over a third wavelength; and a second photodiode configured to receive the upstream optical signals based on the analysis signals over the third wavelength.

14. The OLT of claim 13, wherein the third wavelength is a dedicated wavelength utilized for transmission and reception of optical signals based on the analysis signals generated by the ONU traffic processing module.

15. The OLT of claim 9, wherein the first and second wavelengths are wavelengths defined for OLT communication by the communication protocol.

16. The OLT of claim 9, wherein the optical module further comprises:

a signal switching unit configured to recieve the upstream electrical signals from the ONU traffic processing module and from the limiter amplifier and to provide either the upstream electrical signals received from the ONU traffic processing module or the upstream electrical signals received from the limiter amplifier to the interface.

17. An optical module apparatus, comprising:

an optical sub assembly module comprising a laser diode, operable at a first wavelength, configured to transmit first optical signals over the first wavelength and a photodiode, operable at a second wavelength, configured to receive second optical signals over the second wavelength;

an optical network unit (ONU) traffic processing module configured to perform as an ONU of a passive optical network (PON), to transmit electrical signals to an electrical module, and to test performance of an optical line terminal (OLT), test performance of the PON, detect optical failures in the PON, or measure a round trip time (RTT) of the PON; and a signal splitter configured to split the downstream electrical signals into first downstream electrical signals and second downstream electrical signals, the first downstream electrical signals being provided to the ONU traffic processing module.

18. The optical module apparatus of claim 17, wherein the electrical module is implemented as part of the OLT, and wherein the ONU traffic processing module is coupled to the electrical module.

19. The optical module apparatus of claim 18, further comprising:

a laser driver coupled to the laser diode;

a limiter amplifier coupled to the photodiode;

a controller coupled to an interface; and a signal splitter, coupled to the interface, configured to split the electrical signals into first electrical signals for the ONU traffic processing module and second electrical signals for the laser driver.

20. The optical module apparatus of claim 19, wherein the ONU traffic processing module is further coupled to an output of the limiter amplifier and configured to receive the first electrical signals.

21. The optical module apparatus of claim 20, wherein the optical sub assembly module further comprises:

a second laser diode operable at the second wavelength.

22. The optical module apparatus of claim 21, wherein the second wavelength is a wavelength utilized by at least one of a plurality of ONUs of the PON for upstream communication.

* * * * *

UNITED STATES PATENT AND TRADEMARK OFFICE
CERTIFICATE OF CORRECTION

PATENT NO. : 9,118,982 B2  
APPLICATION NO. : 13/368887  
DATED : August 25, 2015  
INVENTOR(S) : Dvir et al.

Page 1 of 1

It is certified that error appears in the above-identified patent and that said Letters Patent is hereby corrected as shown below:

In the Claims

Column 7, line 39, please replace "comprises" with --comprising--.

Column 7, line 40, please delete "continuous".

Column 7, line 41, please replace "downstream signals" with --downstream electrical signals--.

Column 7, line 41, please delete "received".

Column 7, line 42, please replace "burst" with --electrical--.

Column 7, line 44, please delete "continuous".

Column 7, line 44, please replace "transmit" with --transmit downstream--.

Column 7, line 46, please delete "burst".

Signed and Sealed this
Twelfth Day of January, 2016

Michelle K. Lee
*Director of the United States Patent and Trademark Office*